(12) United States Patent
Okada et al.

(10) Patent No.: US 6,869,110 B2
(45) Date of Patent: Mar. 22, 2005

(54) PIPE JOINT

(75) Inventors: Hiroyuki Okada, Koga (JP); Masaki Akagi, Okazaki (JP)

(73) Assignee: Sanoh Kogyo Kabushiki Kaisha, Koga (JP)

( * ) Notice: Subject to any disclaimer, the term of this patent is extended or adjusted under 35 U.S.C. 154(b) by 0 days.

(21) Appl. No.: 10/451,090

(22) PCT Filed: Jan. 9, 2002

(86) PCT No.: PCT/JP02/00042
§ 371 (c)(1),
(2), (4) Date: Jun. 17, 2003

(87) PCT Pub. No.: WO02/055919
PCT Pub. Date: Jul. 18, 2002

(65) Prior Publication Data
US 2004/0061330 A1 Apr. 1, 2004

(30) Foreign Application Priority Data
Jan. 9, 2001 (JP) .......... 2001-001661

(51) Int. Cl.$^7$ .............................. F16L 35/00
(52) U.S. Cl. ........................ 285/319; 285/93
(58) Field of Search ................. 285/305, 319, 285/921, 93

(56) References Cited

U.S. PATENT DOCUMENTS

| | | | | |
|---|---|---|---|---|
| 5,405,175 A | * | 4/1995 | Bonnah et al. | 285/305 |
| 5,542,716 A | * | 8/1996 | Szabo et al. | 285/305 |
| 5,730,481 A | * | 3/1998 | Szabo et al. | 285/305 |
| 5,951,063 A | * | 9/1999 | Szabo | 285/303 |
| 6,155,612 A | * | 12/2000 | Szabo | 285/319 |
| 6,293,596 B1 | * | 9/2001 | Kinder | 285/305 |
| 6,371,529 B1 | * | 4/2002 | Szabo et al. | 285/319 |
| 6,431,612 B1 | * | 8/2002 | Walker et al. | 285/305 |
| 6,520,646 B2 | * | 2/2003 | Rodriguez et al. | 353/69 |
| 6,612,622 B2 | * | 9/2003 | Andre et al. | 285/305 |
| 6,637,779 B2 | * | 10/2003 | Andre | 285/305 |
| 2003/0137148 A1 | * | 7/2003 | Andre et al. | 285/305 |

FOREIGN PATENT DOCUMENTS

| | | |
|---|---|---|
| DE | 19946260 | 1/2001 |
| EP | 1087169 | 1/2001 |
| JP | 06-207696 | 7/1994 |
| JP | 10509232 | 9/1998 |

OTHER PUBLICATIONS

English Translation of Japan Abstract of JP 6–207696, A (SHOWA Aluminum Corp.) Jul. 26, 1994 Full Text; Figs. 1 to 20.

* cited by examiner

Primary Examiner—Eric K. Nicholson
(74) Attorney, Agent, or Firm—Ladas & Parry LLP

(57) ABSTRACT

A pipe connector having excellent pressure tightness and including a female connector (52), a male connector (54) and a retainer (56) is constructed so that the incomplete connection of the female connector (52) and the male connector (54) can be clearly perceived when the retainer is falsely locked. The retainer (56) has side walls (23a, 23b), first retaining lugs (58a, 58b) formed on the inner side of the side walls (23a, 23b), respectively, each having a first end edge (60a) that engages an annular ridge (20) formed on the male connector (54) to restrain the male connector (54) from axial backward movement when the retainer (56) is pushed into the female connector (52) with the male connector (54) completely inserted in the female connector (52), and a second end edge (60b) opposite to the first end edge (60a), and second retaining lugs (62a, 62b) formed on the inner side of the side walls (23a, 23b) and spaced at least a distance corresponding to the width of the annular ridge (20) apart from the first end edges (60a) of the first retaining lugs (58a, 58b), respectively. The second retaining lugs (62a, 62b) are in contact with a retaining member (32) fitted in a bore formed in the female connector (52) to prevent O rings (31a, 31b) fitted in the bore of the female connector (52) from coming off the bore of the female connector (52) to restrain the retaining member (32) from axial movement.

6 Claims, 11 Drawing Sheets

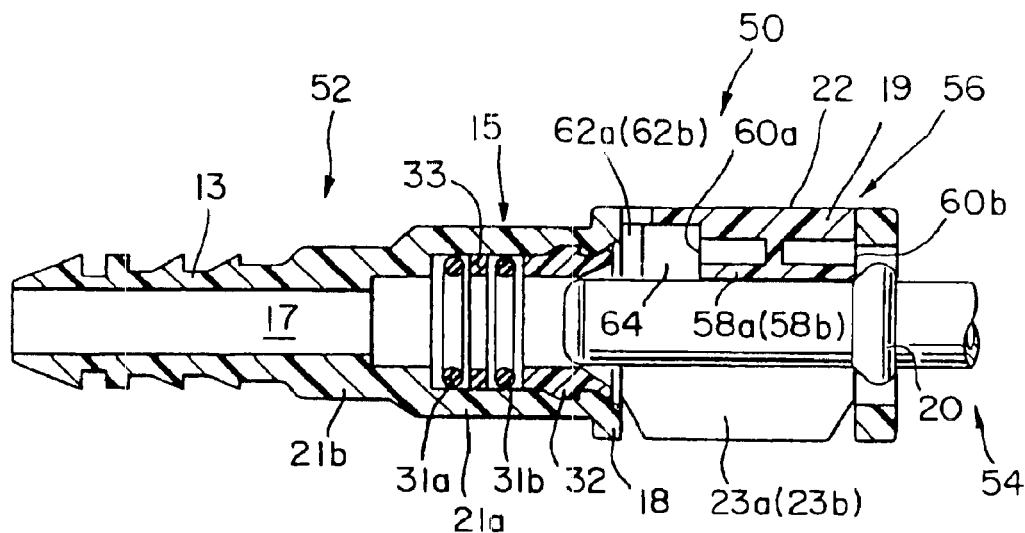
F I G. 5
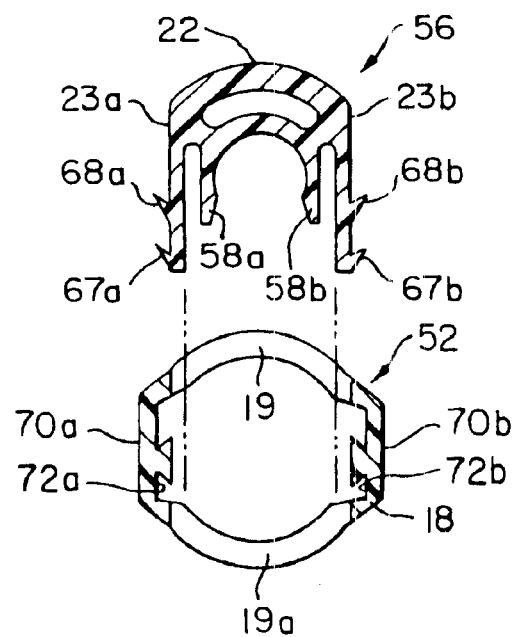
F I G. 6

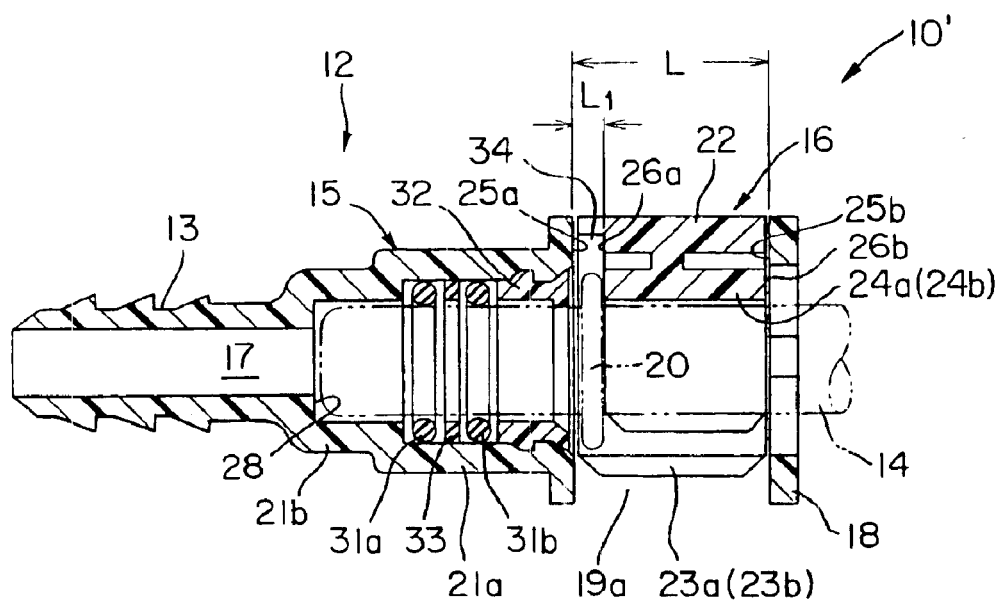
F I G. 14

PIPE JOINT

TECHNICAL FIELD

The present invention relates to a pipe connector and more particularly, to a quick-connect pipe connector for connecting pipes of a fluid circuit included in a machine.

BACKGROUND ART

A pipe connecter called a quick connector is used prevalently for, for example, connecting fuel pipes of automotive fuel supply systems.

A quick connector includes, as principal components, a male connector to be connected to a pipe, a female connector to be connected to a pipe, and a retainer for holding the male and the female connector together. The quick connector is able to connect the pipes without using any fasteners, such as bolts, simply by inserting the male connector in the female connector.

The type quick connecters of various structural designs have been devised. The quick connector is required to have a function to achieve firm connection, a function to facilitate disconnection, a function to achieve high-sealed connection, and a function to avoid incomplete connection. Incomplete connection is false connection in which the male and the female connector are held together with a retainer with the male connector incompletely inserted in the female connector. An improved quick connector constructed to prevent incomplete connection is disclosed in, for example, U.S. Pat. No. 5,542,716 (JP-A No. 50923/1998).

FIGS. 9 to 11 show a conventional quick connector.

FIG. 9 shows a female connector 12 and a male connector 14 of a quick connector 10, FIG. 10 shows a retainer 16, and FIG. 11 shows the female connector 12 and the male connector 14 completely connected together by the retainer 16 in a longitudinal sectional view.

Basically, the quick connector 10 is designed so that the retainer 16 is unable to achieve a locking function when the same is inserted through an opening 19 in the female connector 14 unless the male connector 14 is completely inserted in the female connector 12 to prevent incomplete connection.

Referring to FIGS. 9 and 11, the female connector 12 has a connecting part 13 to be pressed in a pipe, not shown, and a cylindrical housing 15 formed integrally with the connecting part 13. The female connector 12 is provided internally with a stepped, axial bore 17. The housing 15 has a connecting part 18 in which the male connector 14 is inserted. The connecting part 18 is provided with an opening 19 through which the retainer is inserted in the connecting part 18. An opening 19a similar to the opening 19 is formed opposite to the opening 19 in the connecting part 18. The housing 15 has the connecting part 18, a first cylindrical part 21a extending from the connecting part 18 and having a diameter smaller than that of the connecting part 18, and a second cylindrical part 21b extending from the first cylindrical part 21a and having a diameter smaller than that of the first cylindrical part 21a.

The male connector 14 is provided on its outer circumference with an annular ridge 20 at a predetermined distance from one end thereof. The annular ridge 20 engages in a groove formed in the retainer 16 when the retainer 16 is inserted in the connecting part 18 to restrain the male connector 14 from axial movement.

As shown in FIG. 10, the retainer 16 is a substantially U-shaped plastic member formed by molding. The retainer 16 has a body 22 having opposite, parallel side walls 23a and 23b. Retaining lugs 24a and 24b respectively having curved inner surfaces are formed on the inner surfaces of the side walls 23a and 23b, respectively. The retaining lugs 24a and 24b are capable of coming into close contact with the outer circumference of the male connector 14.

Referring to FIG. 11, the opening 19 of the female connector 12 has an axial length L, and the retainer 16 has a length approximately equal to the length L of the opening 19. The opening 19 has a width, i.e., a dimension along a direction perpendicular to the axis of the female connector 12, substantially equal to the width of the retainer 16, i.e., a dimension along a direction perpendicular to the axis of retainer 16. Opposite axial ends of the opening 19 are defined by a front end wall 25a and a rear end wall 25b. The width $L_1$ of a gap between the front end wall 25a, and the front end surfaces 26a of the retaining lugs 24a and 24b of the retainer 16 is substantially equal to slightly greater than the width of the annular ridge 20 of the male connector 14. The positional relation between the annular ridge 20 of the male connector 14, and a space 34 between the front end surfaces 26a of the retaining lugs 24a and 24b of the retainer 16 is determined as to meet the following condition. In a state where the male connector 14 is inserted completely in the female connector 12 such that the front end of the male connector 14 is pressed against a step between the connecting part 13 and the second cylindrical part 21b or the annular ridge 20 is in contact with a top hat 32 serving as a pressing member, the annular ridge 20 is located in the space 34. When the annular ridge 20 is thus located in the space 34, the retainer 16 can be pressed through the opening 19 in the connecting part 18 of the housing 15.

When the retainer 16 is held opposite to the opening 19, the male connector 14 is inserted in the female connector 12 so that the annular ridge 20 is placed in the space 34, and then the retainer 16 is pushed through the opening 19 into the connecting part 18 of the female connector 12, retaining ridges 30a and 30b formed along the lower edges of the side walls 23a and 23b on the outer side surfaces of the side walls 23a and 23b, respectively, engage the lower edges of side walls extending between the end walls 25a and 25b, respectively, to retain the retainer 16 in the connecting part 18 of the female connector 12.

When the retainer 16 is set normally in place on the female connector 12, the front end surfaces 26a of the retaining lugs 24a and 24b of the retainer 16 are in contact with the annular ridge 20 of the male connector 14 to restrain the male connector 14 from backward axial movement. Thus, the female connector 12 and the male connector 14 are firmly inseparably connected together.

A gap between the outer circumference of the male connector 14 and the inner circumference of the first cylindrical part 21a is sealed by O rings 31a and 31b. A spacer 33 is interposed between the O rings 31a and 31b, and the O rings 31a and 31b are held in the gap between the outer circumference of the male connector 14 and the inner circumference of the first cylindrical part 21a and by the top hat 32. Thus, the O rings 31a and 31b are unable to come off the gap into the connecting part 18.

The incomplete connection preventing mechanism of the pipe connector shown in FIGS. 9 to 11 enables the retainer 16 to be inserted through the opening 19 into the connecting part 18 only when the annular ridge 20 is placed in the space 34 to prevent to prevent the false connection of the female connector 12 and the male connector 14 due to the incomplete insertion of the retainer 16 in the connecting part 18.

However, the following problem arises because practical pipe connectors of this type respectively having different sizes need female connectors and male connectors respectively having different sizes.

For example, male connectors 14 of different sizes differ from each other in the length between the annular ridge 20 and the front end. If the retainer 16 is inserted in the connecting part 18 before inserting the male connector 14 in the female connector 12, the annular ridge 20 comes into contact with the rear ends 26b of the retaining lugs 24a and 24b of the retainer 16 as shown in FIG. 12 and, consequently, the male connector 14 cannot be properly inserted in the female connector 12, and the female connector 12 and the male connector 14 are connected incompletely. If a front part extending forward from the annular ridge 20 of the male connector 14 has a long length, the front part of the male connector 14 will reach the O ring 31b and the O ring 31b will become effective. Consequently, it is possible that the incompletely connected pipe connector passes a pressure test and incomplete connection is overlooked. To avoid such incomplete connection, the length of the retainer 16 must be increased so that the rear end surfaces 26b of the retaining lugs 24a and 24b are shifted toward the rear end of the female socket 12 to prevent the front part extending forward from the annular ridge 20 of the male connector 14 from reaching the O ring 31b, which increases the respective lengths of the housing 15 and the retainer 16.

To avoid increasing the length of the housing 15 of the female connector 12 to be connected with a male connector having a long front part extending forward from an annular ridge 20, the position of the annular ridge 20 in a state where the male connector and the female connector 12 are connected normally must be shifted backward with respect to a direction in which the male connector is inserted in the female connector 12 to shift the front end surfaces 26a of the retaining lugs 24a and 24b backward. Therefore, in some cases, the distance $L_2$ between the front end wall 25a of the female connector 12 and the front end surfaces 26a of the retaining lugs 24a and 24b becomes unavoidably considerably long as shown in FIG. 13. When the female connector 12 is formed in a structure as shown in FIG. 13, it is possible that the pressure tightness of the pipe connector is reduced and, when the pressure in pipes connected to the pipe connector becomes high, that the top hat 32 is forced into the connecting part 18, the O rings 31a and 31b are dislocated and the sealing effect thereof is nullified, even if the retainer 16 is engaged normally with the female connector 12 to connect the female connector 12 and the male connector completely.

The following problem arises even in a state shown in FIG. 11, where the retainer 16 functions normally and the female connector 12 and the male connector 14 are completely connected together. When piping is arranged such that the pipe connector 10 shown in FIG. 11 is set upside down, it is possible that water formed by condensation or the like collects in the space 34 between the front end wall 25a, and the front end surfaces 27a of the retaining lugs 24a and 24b, and the female connector 12 will be corroded if the female connector 12 is formed of a metal.

The foregoing problems in the prior art are attributable mostly to false connection of the female connector 12 and the male connector 14 incompletely inserted in the female connector by the retainer 16. Another problem in the prior art is the false assembly of the female connector 12 and the retainer 16.

When shipping a conventional quick connector, the female connector 12 and the retainer 16 are wrongly combined by false assembly.

Some conventional quick connector 10' includes a directional retainer 16 which must be set in a specific position in a female connector 12 as shown in FIG. 14. In the conventional connector 10' shown in FIG. 14, the rear end surfaces 26b of retaining lugs 24a and 24b not in contact with an annular ridge 20 formed on a male connector 14 are formed so as to be in contact flat with a rear end wall 25b. Therefore, the retainer 16 must be inserted through an opening in the female connector 12 with the front end surfaces 26a, which engages the annular ridge 20, of the retaining lugs 24a and 24b facing the front.

As shown in FIG. 15(a), the side walls of the connecting part 18 of a female connector 12 are provided in their horizontal upper edges with recesses 37, and the side walls 23a and 23b of a retainer 16 are provided with projections 38 which engage in the recesses 37, on their outer surfaces, respectively. The projections 38 are formed at positions somewhat behind the middle points of the side walls 23a and 23b, respectively, to make a distinction between the front and the rear end of the retainer 16 in appearance, and the positions of the recesses 37 are determined so as to correspond to those of the projections 38.

FIG. 15(a) shows the female connector 12 and the retainer 16 in a correct assembly. When the quick connector 10' is shipped from a factory, the retainer 16 half-inserted in the female connector 12 such that an upper half part of the retainer 16 protrudes from the connecting part 18 to prevent false connection.

However, it often occurs that the retainer 16 is inserted wrongly in the connecting part 18 in a reverse position as shown in FIG. 15(b). However, the difference between a correct assembly of the female connector 12 and the retainer 16 and a wrong assembly of the same is not so significant as to enable making a clear distinction between the correct and the wrong assembly at a glance and, consequently, wrong assemblies are overlooked and are delivered to customers.

If the retainer 16 is reversed, the retainer 16 is unable to lock together the female connector 12 and a male connector 14 inserted in the female connector 12 by pushing the retainer 16 into the female connector 12 because the projections 38 rest on the horizontal upper edges 16a of the side walls of the connecting part 18, so that false connection can be avoided. In such a case, the user needs additional work for pulling out the retainer 16 from the female connector 12 and inserting the retainer 16 in a correct position in the female connector 12.

Moreover, it is possible that the retainer 16 is inserted through the other opening 19a on the side of lower horizontal edges 16b of the side walls not provided with any recess in the female connector 12 as indicated by two-dot chain lines in FIG. 15(b).

DISCLOSURE OF THE INVENTION

Accordingly, it is a first object of the present invention to solve the foregoing problems in the prior art and to provide a pipe connector including a female connector, a male connector and a retainer, having structure that enables clear recognition of incomplete connection of the female connector and the male connector when the retainer locks together the female and the male connector falsely, and excellent in pressure-proof strength.

A second object of the present invention is to provide a pipe connector including a female connector, a male connector, and a retainer that is never combined falsely with the female connector for shipping from a factory.

According to one aspect of the present invention, a pipe connector includes: a male connector provided with an annular ridge; a female connector having a housing provided with an opening; and a U-shaped retainer having a body, and opposite side walls to be inserted through the opening in the housing in a direction perpendicular to an axial direction to lock together the male and the female connector; wherein a false connection preventing structure is formed to make the retainer unable to be pushed through the opening into the housing to lock together the male and the female connector when the male connector is inserted incompletely in the female connector; the retainer is provided with first retaining lugs formed on the inner side of the side walls, each having a first end edge that engages the annular ridge when the male connector is inserted completely in the female connector and the retainer is inserted in the housing of the female connector to restrain the male connector from axial backward movement, and a second end edge opposite to the first end edge, and second retaining lugs spaced at least a distance corresponding to the width of the annular ridge apart from the first end edges of the first retaining lugs, respectively; and the second retaining lugs are in contact with a retaining member fitted in a bore formed in the female connector to prevent O rings fitted in the bore of the female connector from coming off the bore of the female connector to restrain the retaining member from axial movement.

According to another aspect of the present invention, a pipe connector includes: a male connector provided with an annular ridge; a female connector having a housing provided with an opening; and a U-shaped retainer having a body, and opposite side walls to be inserted through the opening in the housing in a direction perpendicular to an axial direction to lock together the male and the female connector; wherein a false connection preventing structure is formed to make the retainer unable to be pushed through the opening into the housing to lock together the male and the female connector when the male connector is inserted incompletely in the female connector; and the retainer is provided with retaining lugs formed on the inner side of the side walls, each having a first end edge that engages the annular ridge when the male connector is inserted completely in the female connector and the retainer is inserted in the housing of the female connector to restrain the male connector from axial backward movement, and a second end edge opposite to the first end edge, and a false assembly preventing means for preventing the retainer from being combined with the female connector when the retainer is pushed to insert the same through the opening in the housing in a longitudinally reversed position.

BRIEF DESCRIPTION OF THE DRAWINGS

FIG. 5 is a longitudinal sectional view of the pipe connector shown in FIG. 1 in a state where the female and the male connector a falsely connected by the retainer;

FIG. 6 is a sectional view of a retainer in a modification;

FIG. 14 is a longitudinal sectional view of a third conventional pipe connector;

BEST MODE FOR CARRYING OUT THE INVENTION

Pipe connectors in preferred embodiments according to the present invention will be described with reference to the accompanying drawings;

First Embodiment

Figure 1:
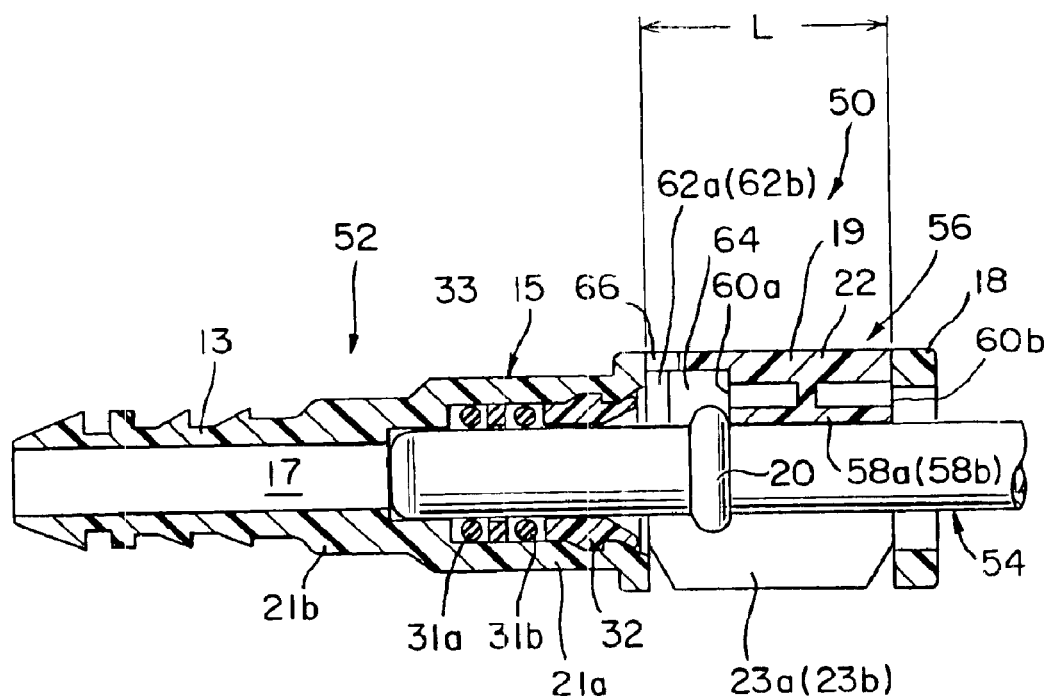
FIG. 1 is a longitudinal sectional view of a pipe connector in a first embodiment according to the present invention.

FIG. 1 is a longitudinal sectional view of a pipe connector 50 in a first embodiment according to the present invention. A female connector 52, a male connector 54 and a retainer 56 included in the pipe connector 50 have parts similar to those of the female connector 12, the male connector 14 and the retainer 16 of the conventional pipe connector shown in FIGS. 9 and 10. The parts of the female connector 52, the male connector 54 and the retainer 56 similar to those of the female connector 12, the male connector 14 and the retainer 16 of the conventional pipe connector are denoted by the same reference characters and the description thereof will be omitted.

Figure 2:
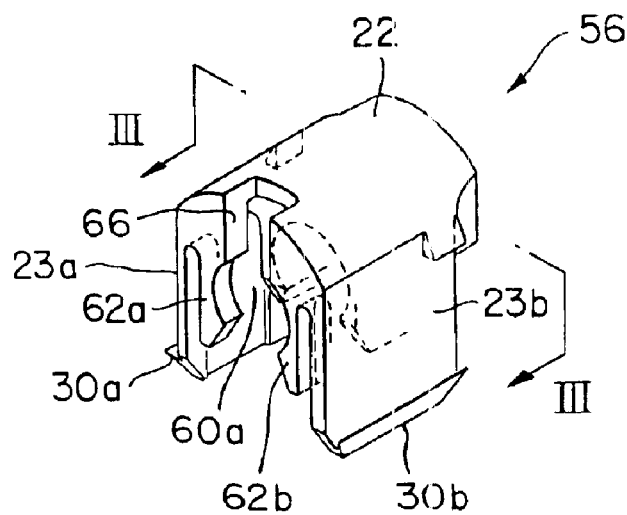
FIG. 2 is a perspective view of a retainer included in the pipe connector.
Figure 3:
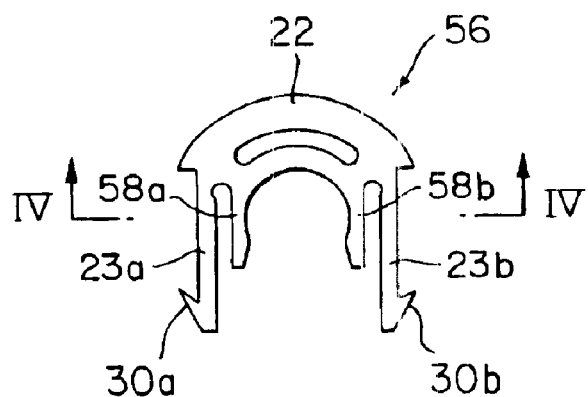
FIG. 3 is a sectional view taken on line III—III in FIG. 2.

As shown in FIGS. 2 and 3, the retainer 56 is a U-shaped member formed in a single piece by molding a plastic material. The retainer 56 has a body 22, and opposite, parallel side walls 23a and 23b. The side walls 23a and 23b are integrally provided with first retaining lugs 58a and 58b respectively having curved inner surfaces. The retaining lugs 58a and 58b come into close contact with the outer circumference of the male connector 54.

Each of the first retaining lugs 58a and 58b of the retainer 56 has a first end edge 60a, i.e., an end edge on the front side with respect to a direction in which the male connector 54 is inserted in the female connector 52, a second end edge 60b, i.e., an end edge on the back side. The first end edge 60a engages an annular ridge 20 formed on the male connector 54 when the male connector 54 is inserted completely in the female connector 52 to restrain the male connector 54 from axial, backward movement.

Figure 4:
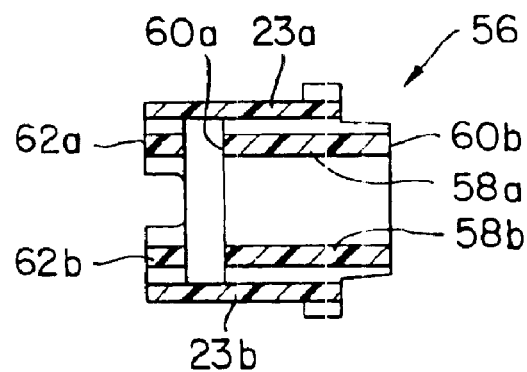
FIG. 4 is a sectional view taken on line IV—IV in FIG. 3.

The retainer 56 is integrally provided, in addition to the first retaining lugs 58a and 58b, with second retaining lugs 62a and 62b as shown in FIGS. 2 and 4. The second retaining lugs 62a and 62b have curved inner surfaces conforming to the outer circumference of the male connector 54. The second retaining lugs 62a and 62b are spaced a distance greater than the width of the annular ridge 20 of the male connector 54 apart. As shown in FIG. 1, the retainer 56 has a length approximately equal to the length L, i.e., a dimension along the axis of the female connector 54, of an opening 19 formed in the female connector 52, and a width approximately equal to the width, i.e., a dimension in a direction perpendicular to the axis of the female connector 52, of the opening 19. When the male connector 54 is inserted completely in the female connector 52 so that the front end of the male connector 54 comes into contact with a step formed in a bore 17 between a connecting part 17 and a second cylindrical part 21*b*, the annular ridge 20 is located in a space corresponding to a space 64 between the first end edges 60*a* of the first retaining lugs 58*a* and 58*b* of the retainer 56, and the second retaining lugs 62*a* and 62*b*. In this state, the retainer 56 can be pushed in the female connector 52. When the retainer 56 is fully inserted in the female connector 52, retaining ridges 30*a* and 30*b* formed on the side walls 23*a* and 23*b* of the retainer 56 engage the horizontal lower edges of side walls, not shown, defining the opening 19 to lock the retainer 56 in place.

In a state where the retainer 56 is locked in place on the female connector 52, the first end edges 60*a* of the first retaining lugs 58*a* and 58*b* engage the annular ridge 20 of the male connector 54 as shown in FIG. 1. Thus, the male connector 54 cannot be extracted from the female connector 52 even if a pulling force is exerted on the male connector 54.

When the retainer 56 is locked, and the female connector 52 and the male connector 54 are completely connected together, the second retaining lugs 62*a* and 62*b* of the retainer 56 are in contact with a top hat 32 serving as a retaining ring for holding in place O rings 31*a* and 31*b* fitted in the bore of the first cylindrical part 21*a* to hold the top hat 32 in place.

When the pressure in a pipe connected to the pipe connector 50 increases, the pressure tends to force the top hat 32 out of the first cylindrical part 21*a* into a connecting part 18 provided with the opening 19. However, the top hat 32 is unable to be pushed into the connecting part 18 because the top hat 32 is restrained from axial movement by the second retaining lugs 62*a* and 62*b* of the retainer 56. Therefore, the O rings 31*a* and 31*b* will not be dislocated, the sealing effect thereof will not be nullified, and hence the pipe connector 50 is able to maintain high pressure tightness.

FIG. 5 shows the positional relation between the male connector 54 and the retainer 56 when the male connector 54 is inserted in the female connector 52 after pushing the retainer 56 in the female connector 52 and locking the retainer 56 on the female connector 52.

The annular ridge 20 of the male connector 54 is in contact with second end edges 60*b* of the first retaining lugs 58*a* and 58*b* of the retainer 56 and hence the male connector 54 cannot be inserted any further in the female connector 52. The length of a front part extending forward from the annular ridge 20 of the male connector 54, the length of the retainer 56, and the position of the second end edges 60*b* are determined so that the front end of the front part of the male connector 54 is unable to reach the O rings 31*a* and 31*b* in the state shown in FIG. 5.

Therefore, if the retainer 56 is falsely locked with the male connector 54 inserted incompletely in the female connector 52 as shown in FIG. 5, the O rings 31*a* and 31*b* are ineffective, and hence, if a fluid flows through the pipe, the fluid leaks necessarily from the pipe connector 50. Thus, an undesirable condition, in which the O rings 31*a* and 31*b* are able to exercise a sealing function with the female connector 52 and the male connector 54 incompletely connected together, can be prevented.

Preferably, the body 22 of the retainer 56 is provided with a drain groove 66 formed between the second retaining lugs 62*a* and 62*b* as shown in FIG. 2. As shown in FIG. 1, the drain groove 66 communicates with the space 64 between the first retaining lugs 58*a* and 58*b*, and the second retaining lugs 62*a* and 62*b*. When piping is arranged such that the pipe connector 50 shown in FIG. 1 is set upside down, water can be drained from the space 64 through the draining groove 66 and any water stays in the space 64. Therefore, even if the male connector 54 is a metal pipe, the corrosion of the male connector 54 by water can be prevented.

Referring to FIG. 6 showing a retainer 56 in a modification of the retainer 56 shown in FIG. 2, the retainer 56 in the modification has side walls 23*a* and 23*b* provided with anchoring structures, respectively. The anchoring structure of the side wall 23*a* includes a lower retaining ridge 67*a* and an upper retaining ridge 68*a*, and the anchoring structure of the side wall 23*b* includes a lower retaining ridge 67*b* and an upper retaining ridge 68*b*. A female connector 52 has a connecting part 18 provided with side walls 70*a* and 70*b*. The lower retaining ridges 67*a* and 67*b* engage the lower edges of the side walls 70*a* and 70*b*, and the upper retaining ridges 68*a* and 68*b* engage in grooves 772*a* and 72*b* formed in the inner surfaces of the side walls 70*a* and 70*b*, respectively.

Since each of the anchoring structures has the two retaining ridges, i.e., the upper and the lower retaining ridge, the retainer 56 can be locked in place by the retaining structures even if one of the two retaining ridges is broken or is not formed correctly due to short shot in the molding process.

Second Embodiment

A pipe connector in a second embodiment according to the present invention will be described with reference to FIGS. 7 and 8.

The pipe connector in the second embodiment has a false assembly preventing structure for preventing the false assembly of a female connector 52 and a retainer 56. The female connector 52 and the retainer 56 are basically identical in construction with those of the pipe connector in the first embodiment. Therefore parts of the female connector 52 and the retainer 56 of the pipe connector in the second embodiment similar to those of the pipe connector in the first embodiment are denoted by the same reference characters and the description thereof will be omitted. Only the false assembly preventing structure will be described.

Figure 7:
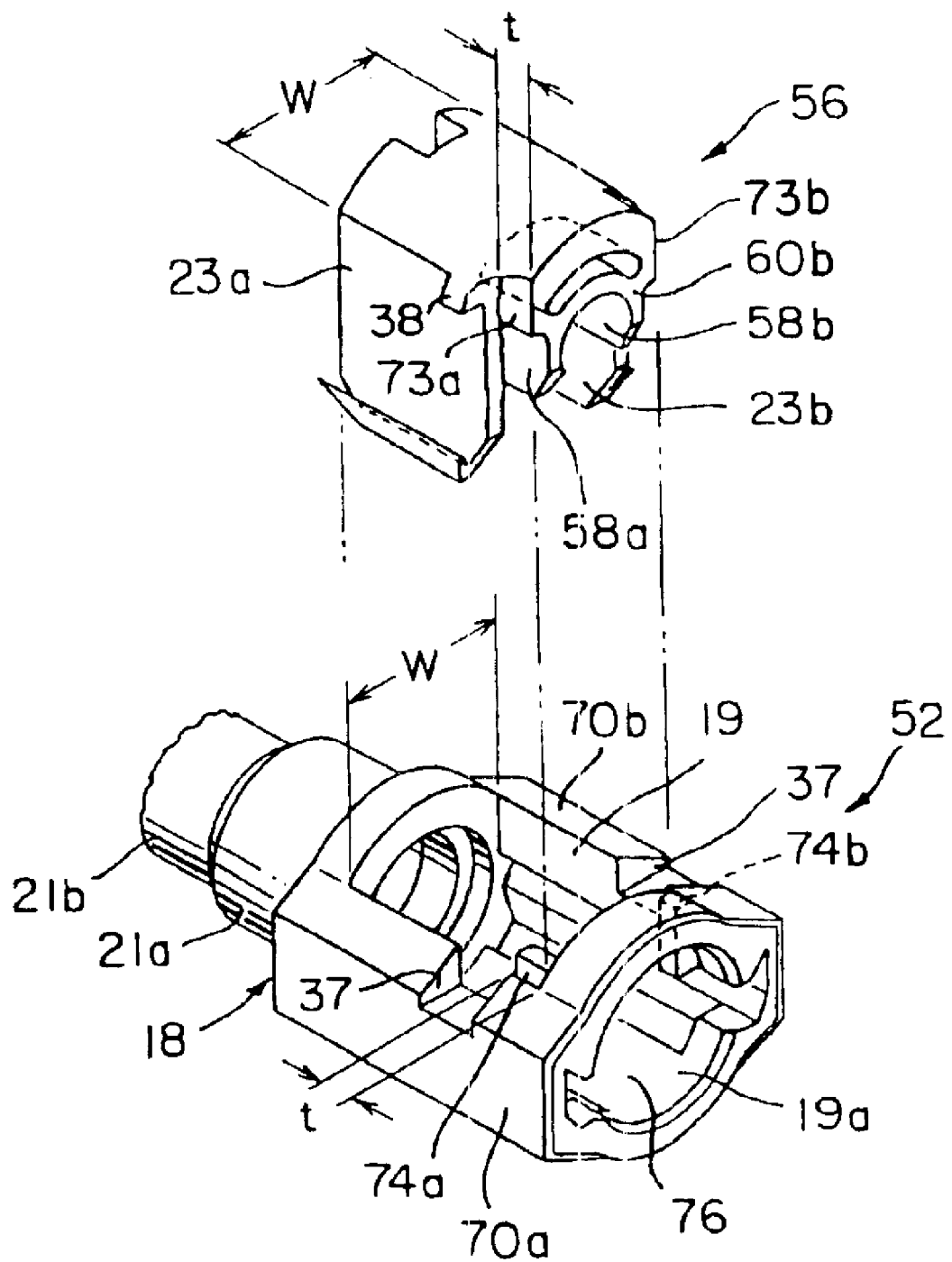
FIG. 7 is a perspective view of an essential part of a pipe connector in a second embodiment according to the present invention.

Referring to FIG. 7, portions of end edges of side walls 23*a* and 23*b* on the side of the second end edges 60*b* of first retaining lugs 58*a* and 85*b* formed in the retainer 56 are cut in an axial depth t to form recesses 73*a* and 73*b*. End portions of the first retaining lugs 58*a* and 58*b* corresponding to the recesses 73*a* and 73*b* project from a plane including the end edges of the side walls 23*a* and 23*b*. The width of a part including the recesses 73*a* and 73*b* of the retainer 56 is smaller than the width w of the retainer 56. Second retaining lugs 62*a* and 62*b*, not shown in FIG. 7, similar to those shown in FIG. 2 are formed on the inner surfaces of the side walls 23*a* and 23*b* of the retainer 56.

Square projections 74*a* and 74*b* of dimensions corresponding to those of the recesses 73*a* and 73*b* are formed integrally with a connecting part 18 of the female connector 52 in the corners of one end of an opening 19. The square projections 74*a* and 74*b* have a length t, i.e., a dimension in the direction of the axis of the female connector 52. The distance between the square projections 74*a* and 74*b* is smaller than the distance between the side walls 70*a* and 70*b* of the connecting part 18.

Figure 8:
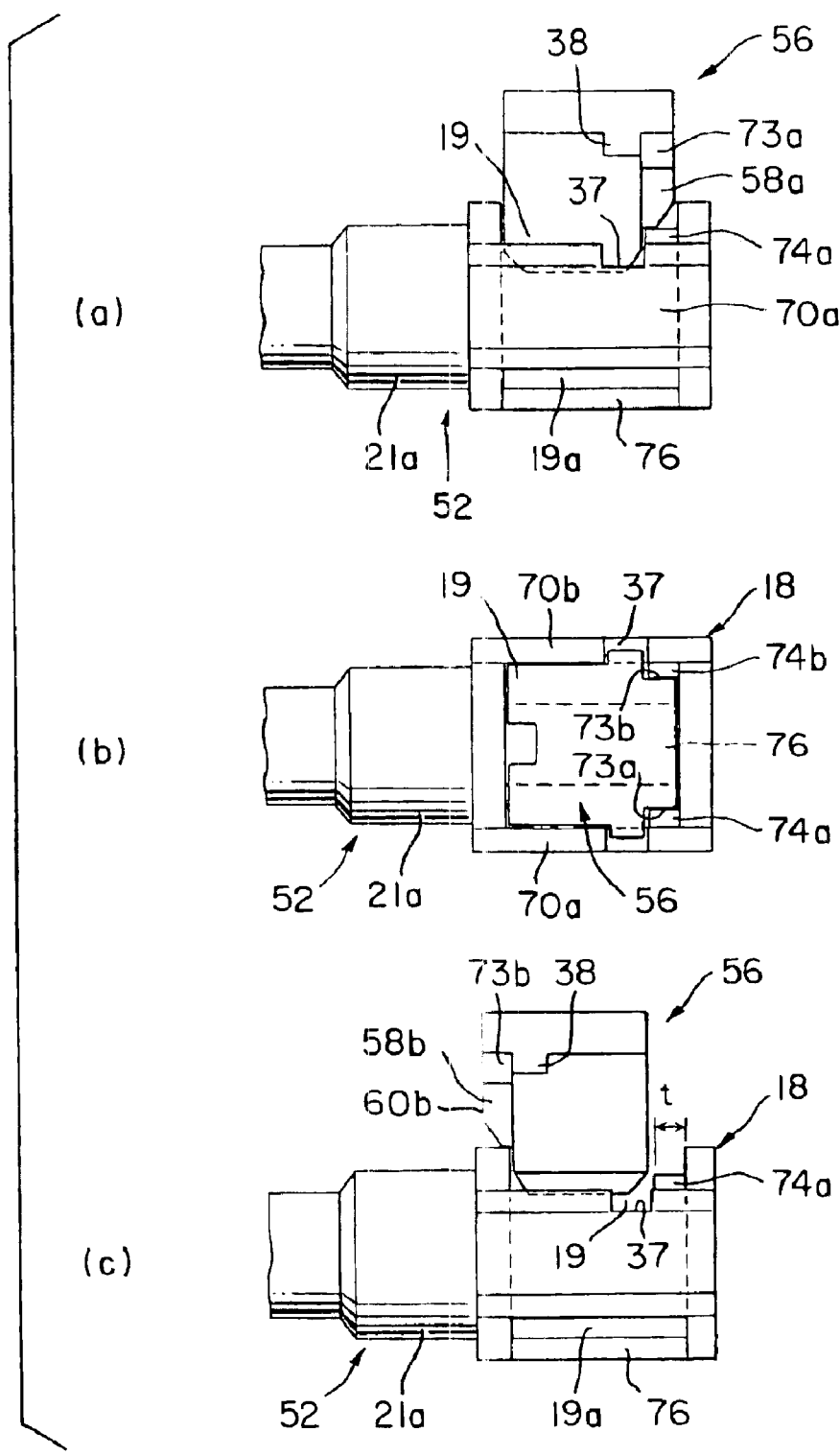
FIGS. 8(a), 8(b) and 8(c) are views of assistance in explaining the function of the pipe connector in the second embodiment to prevent false combination of a retainer with a female connector.

FIG. 8(*a*) is a side elevation of an assembly of the female connector 52, and the retainer 56 put on the female connector 52 in a correct direction. The combination of the female connector 52 and the retainer 56 put on the female connector 52 so as to protrude from the female connector 52 as shown in FIG. 8(a) is shipped from the factory. FIG. 8(b) is a top plan view of the combination of the female connector 52 and the retainer 56 shown in FIG. 8(a). The recesses 73a and 73b are positioned in the opening 19 of the female connector 52 as shown in FIG. 8(b) when the retainer 56 is correctly oriented with respect to the female connector 52. Since the square projections 74a and 74b are engaged in the recesses 73a and 73b, respectively, in a state shown in FIG. 8(b), the retainer 56 can be pushed through the opening 19 into the female connector 52 to lock the retainer 56 in place on the female connector 52.

FIG. 8(c) shows a state where the retainer 56 is disposed in a longitudinally reverse direction relative to the opening 19. When the retainer 56 in the state shown in FIG. 8(c) is pushed, the retainer 56 is pushed forward by a distance corresponding to the length t of the square projections 74a and 74b because the distance between the square projections 74a and 74b is smaller than the width of the retainer 56. Consequently, the parts of the first retaining lugs 58a and 58b around the first end edges 60b projecting from a plane including the end edges of the side walls 23a and 23b hit on a front end wall defining the opening 19 of the female connector 52, so that the retainer 56 cannot be combined with the female connector 52. Thus, the false combination of the retainer 56 and the female connector 52 can be prevented with reliability.

The combination of the recesses 73a and 73b, and the square projections 74a and 74b may prevent, in addition to the false assembly of the female connector 52 and the retainer 56, the insertion of the retainer 56 through an opening 19a opposite the opening 19 provided with the square projections 74a and 74b in the female connector 52.

As shown in FIG. 7, a longitudinal bar 76 is formed integrally with the connecting part 18 of the female connector 52 so as to extend in a middle part of the opening 19a of the connecting part 18 to prevent the insertion of the retainer 56 through the opening 19a in the female connector 52. Thus, the wrong insertion of the retainer 56 from a wrong direction in the female connector 52 can be surely prevented.

Figure 9:
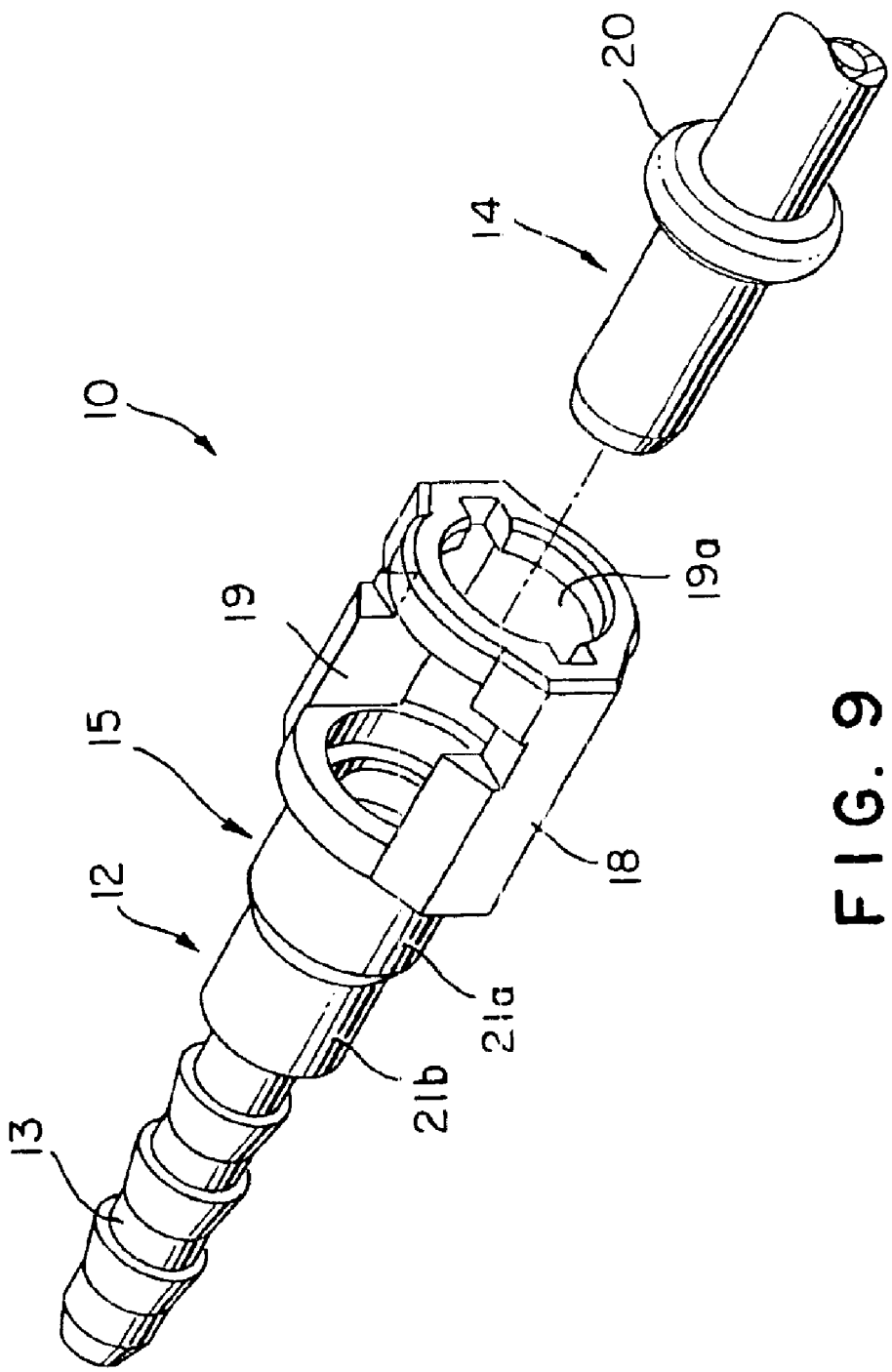
FIG. 9 is a perspective view of a conventional quick-connection pipe connector.
Figure 10:
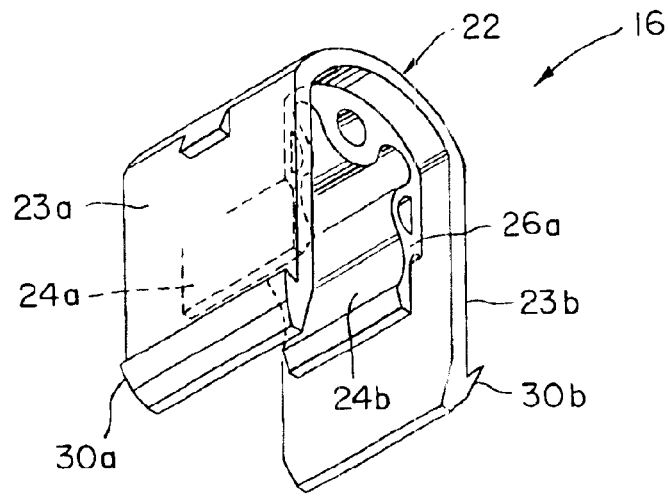
FIG. 10 is a perspective view of a retainer included in the conventional pipe connector shown in FIG. 9.
Figure 11:
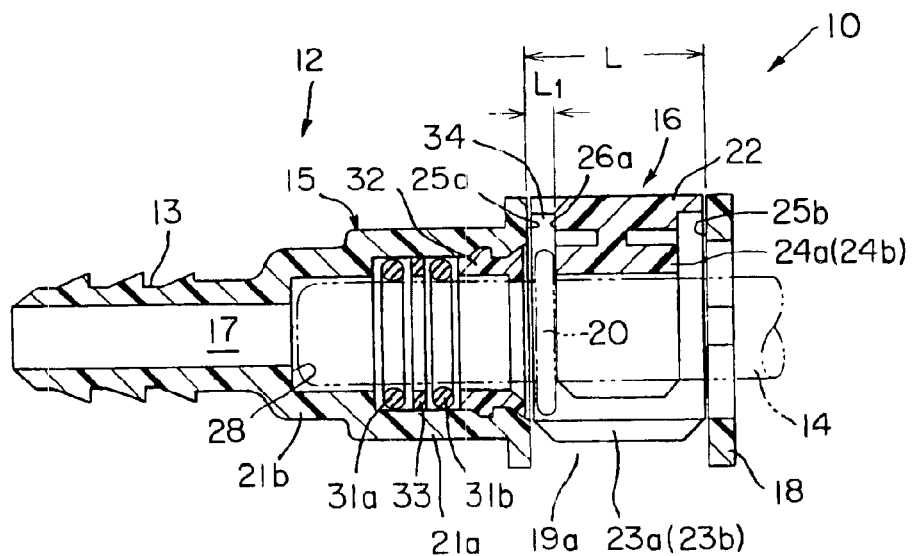
FIG. 11 is a longitudinal sectional view of the conventional pipe connector.
Figure 12:
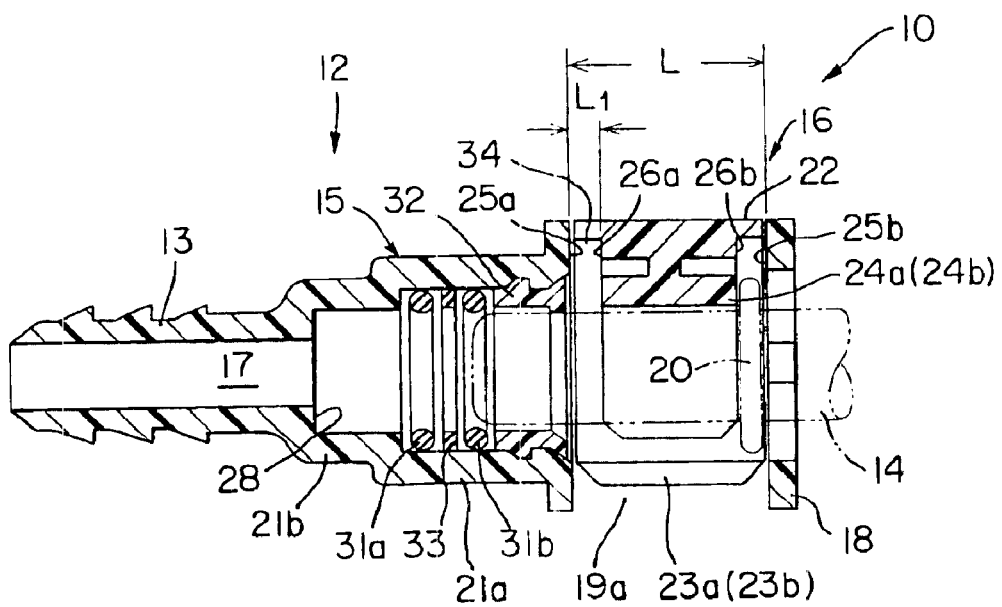
FIG. 12 is a longitudinal sectional view of the conventional pipe connector in a falsely connected state.
Figure 13:
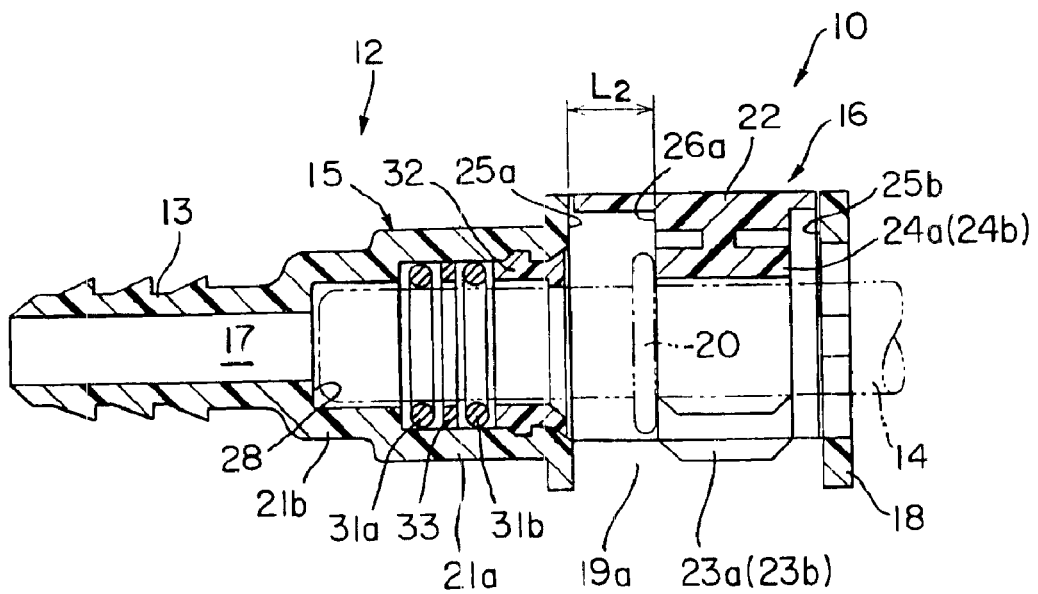
FIG. 13 is a longitudinal sectional view of another conventional pipe connector.
Figure 15:
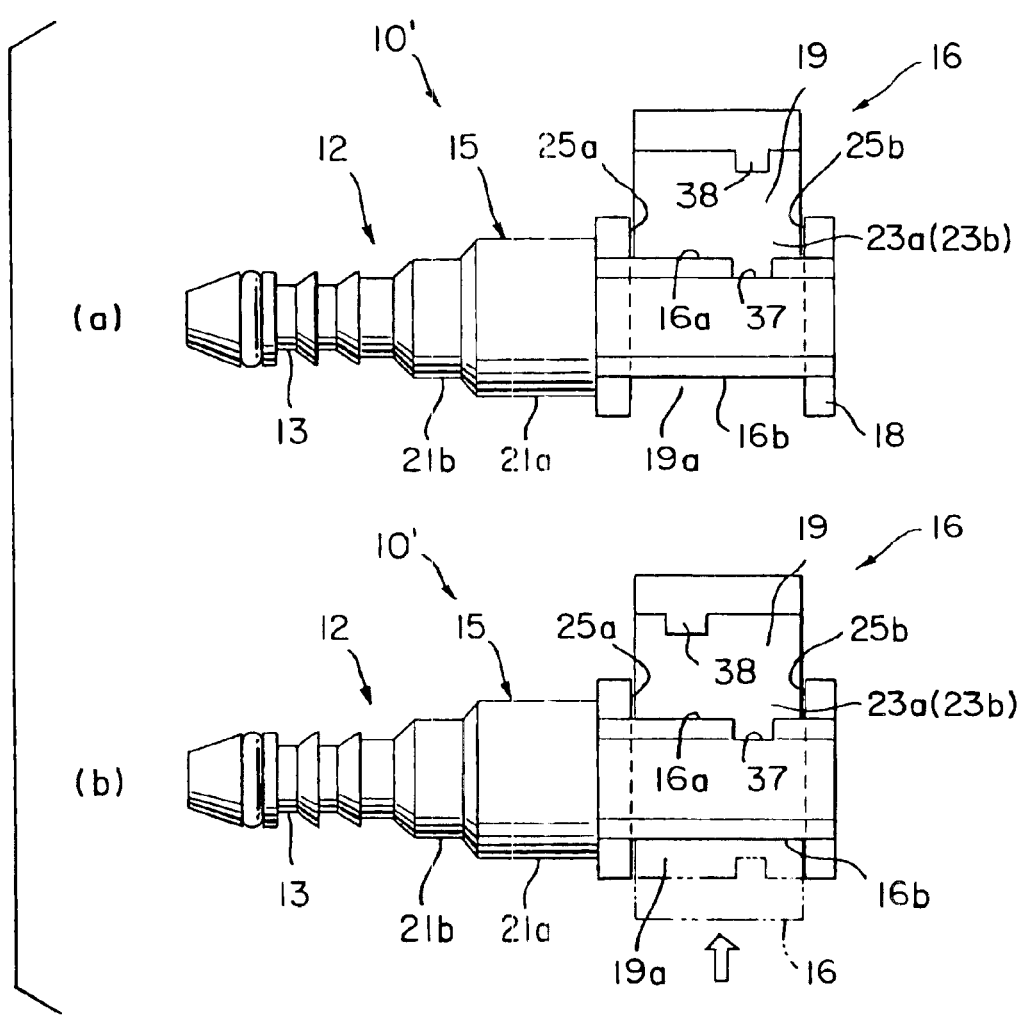
FIGS. 15(a) and 15(b) are views of assistance in explaining the false insertion of a retainer in a female connector in a conventional pipe connector.
Figure 16:
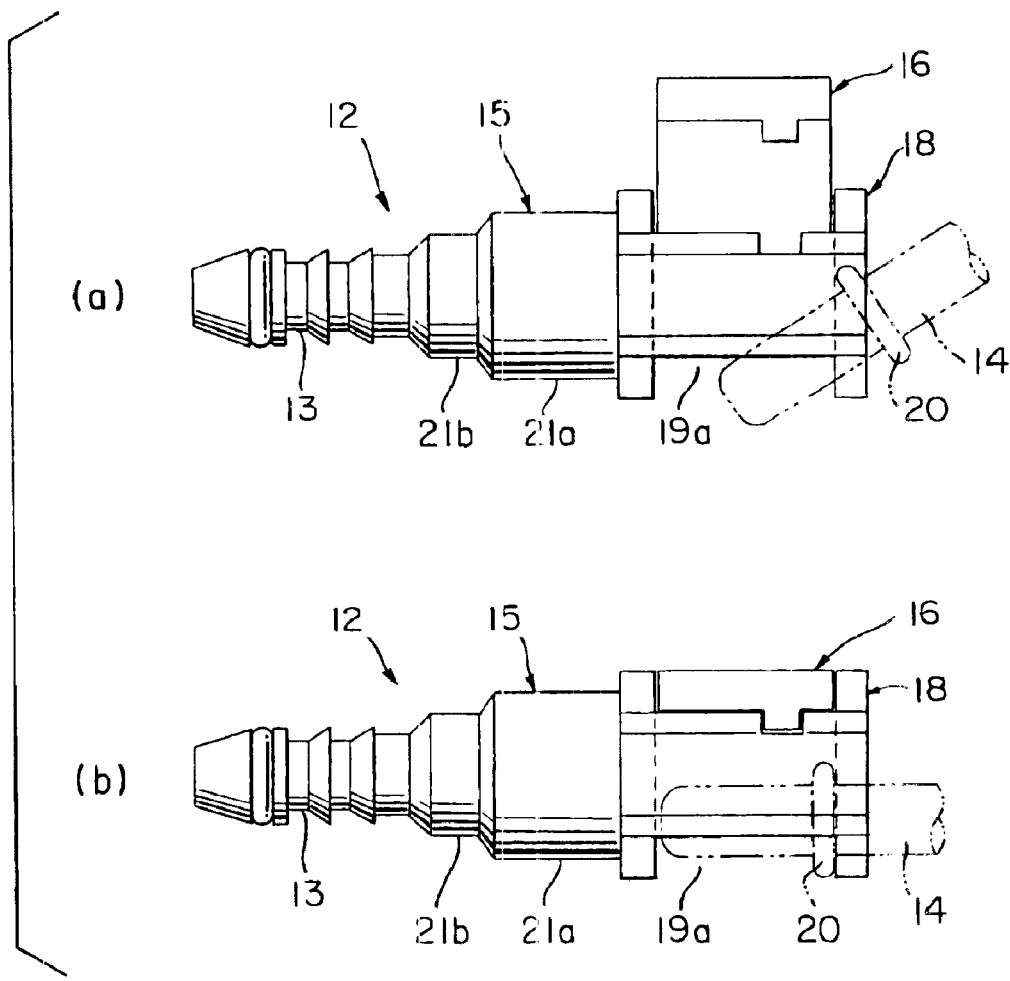
FIGS. 16(a) and 16(b) are views of assistance in explaining the false insertion of a male connector in a female connector in a conventional pipe connector.

FIGS. 16(a) and 16(b) show examples of false assembly of the conventional quick-connection pipe connector 10 shown in FIG. 9; the front end part of the male connector 14 is falsely extended through the opening 19a through which the retainer 16 is not inserted in the female connector 12 in FIG. 16(a), and the male connector 14 is biased toward the opening 19a in a state where the retainer 16 is falsely locked in FIG. 16(b). These false states can be prevented by the bar 76 extended in the opening 19a.

As apparent from the foregoing description, according to the present invention, the O ring retaining member is restrained from coming off the bore of the female connector to enhance the pressure tightness of the pipe connector considerably, the incomplete connection of the female and the male connector can be clearly perceived because the front end part of the male connector is unable to engage the O rings when the retainer is falsely locked, and the use of the pipe connector with the female and the male connector incompletely connected can be prevented.

The false combination of the retainer with the female connector can be surely avoided when shipping the pipe connector from the factory.

What is claimed is:

1. A pipe connector comprising:
   a male connector provided with an annular ridge;
   a female connector having a housing provided with an opening; and
   a U-shaped retainer having a body, and opposite side walls to be inserted through the opening in the housing in a direction perpendicular to an axial direction to lock together the male and the female connector;
   wherein a false connection preventing structure is formed to make the retainer unable to be pushed through the opening into the housing to lock together the male and the female connector when the male connector is inserted incompletely in the female connector;
   the retainer is provided with first retaining lugs formed on the inner side of the side walls, each having a first end edge that engages the annular ridge when the male connector is inserted completely in the female connector and the retainer is inserted in the housing of the female connector to restrain the male connector from axial backward movement, and a second end edge opposite to the first end edge, and second retaining lugs spaced at least a distance corresponding to the width of the annular ridge apart from the first end edges of the first retaining lugs, respectively; and
   the second retaining lugs are in contact with a retaining member fitted in a bore formed in the female connector to prevent O rings fitted in the bore of the female connector from coming off the bore of the female connector to restrain the retaining member from axial movement;
   wherein each of the side walls of the retainer has an anchoring part provided with a retaining ridge capable of engaging the female connector to lock the retainer in place;
   wherein the retaining ridge of each anchoring part is formed at positions at two different levels.

2. The pipe connector according to claim 1, wherein the second end edges of the first retaining lugs engage the annular ridge of the male connector to obstruct the further insertion of the male connector in the female connector and to prevent a front end part of the male connector from reaching the O ring when a front part of the male connector is inserted in the female connector after the retainer has been locked in place on the female connector.

3. The pipe connector according to claim 1, wherein the retainer is provided with a drain hole for draining water collected in a space between the first and the second retaining lugs.

4. A pipe connector comprising:
   a male connector provided with an annular ridge;
   a female connector having a housing provided with an opening; and
   a U-shaped retainer having a body, and opposite side walls to be inserted through the opening in the housing in a direction perpendicular to an axial direction to lock together the male and the female connector;
   wherein a false connection preventing structure is formed to make the retainer unable to be pushed through the opening into the housing to lock together the male and the female connector when the male connector is inserted incompletely in the female connector;
   the retainer is provided with first retaining lugs formed on the inner side of the side walls, each having a first end edge that engages the annular ridge when the male connector is inserted completely in the female connector and the retainer is inserted in the housing of the female connector to restrain the male connector from axial backward movement, and a second end edge opposite to the first end edge, and second retaining lugs spaced at least a distance corresponding to the width of the annular ridge apart from the first end edges of the first retaining lugs, respectively; and the second retaining lugs are in contact with a retaining member fitted in a bore formed in the female connector to prevent O rings fitted in the bore of the female connector from coming off the bore of the female connector to restrain the retaining member from axial movement; said pipe connector further comprising a false assembly preventing means for preventing the retainer from being inserted into the opening in the female connector and from being held on the opening and for preventing the false assembly of the retainer and the female connector from being inserted in a longitudinally reverse position.

5. The pipe connector according to claim 4, wherein the false assembly preventing means includes:

recesses formed in rear end edges of the side walls so that rear end parts having the second end edges of the first retaining lugs project from a plane including the rear end edges of the side walls; and square projections having dimensions corresponding to those of the recesses, and protruding into the opening from corners of the opening.

6. The pipe connector according to claim 4, wherein the false assembly preventing structure includes a longitudinal bar formed so as to extend in a middle part of a second opening opposite to the opening to prevent the insertion of the retainer through the second opening in the female connector.

* * * * *